May 8, 1962   J. C. McMILLAN   3,033,039
COMBINATION PRESSURE TRANSDUCER
Filed Oct. 10, 1956

INVENTOR.
JOHN C. McMILLAN
BY
Walter J. Jason
ATTORNEY

United States Patent Office 3,033,039
Patented May 8, 1962

3,033,039
COMBINATION PRESSURE TRANSDUCER
John C. McMillan, Pomona, Calif., assignor to General Dynamics Corporation, San Diego, Calif., a corporation of Delaware
Filed Oct. 10, 1956, Ser. No. 615,096
2 Claims. (Cl. 73—398)

This invention relates to combination pressure transducers for independently measuring related pressures and more particularly to pressure transducers having an absolute pressure reference from a single vacuum source.

Heretofore the independent measurement of related pressures has been with separate devices using separate reference pressure containers. These containers were all for the same purpose, namely, to provide an absolute pressure reference for each of the related devices. This, of course, multiplied the weight, space and cost factor by the number of devices used. In the instrumentation of aircraft and missiles, the reduction of weight and space is highly desirable. This is accomplished in the present invention through the use of only one vacuum chamber for use as an absolute pressure reference in the measurement of unrelated as well as related pressures. In the event of vacuum chamber malfunctioning, such indication would be at once evident in all pressure instruments, an observation which would at once indicate inaccurate readings that might otherwise be undetected if only one instrument were in error. In addition, flexible sensing members having the shorter range of linear yield or lesser elasticity with pressure are used in measuring pressures having the least expected range of variation and flexible members having a longer range of linear yield or greater elasticity with pressure are used in measuring pressures having a greater expected range of variation. All components are fabricated with a high rigidity-to-mass ratio to withstand vibrations and still be of minimum weight.

It is therefore an object of this invention to provide for an improved pressure transducer for simultaneously sensing a plurality of pressures.

Another object is the provision of a plurality of pressure sensing elements having the same reference pressure.

Another object is the provision of elements for sensing related pressures wherein the element for sensing the greater range of expected pressures has the greater range of linear response and the element for sensing the lesser range of expected pressures has the lesser range of linear response.

Another object is the provision of elements for sensing related pressures selectively for independent or differential indication as desired.

Another object is the provision of a single absolute pressure reference source for all pressure sensing devices used in and by a movable object.

A further object is the provision of a plurality of pressure transducers designed, arranged and related so as to have a minimum combined weight and size consistent with accuracy, reliability and minimum maintenance and repair requirements.

Other objects and features of the present invention will be readily apparent to those skilled in the art from the following specification and appended drawings wherein is illustrated a preferred form of the invention, and in which.

Figure 1:
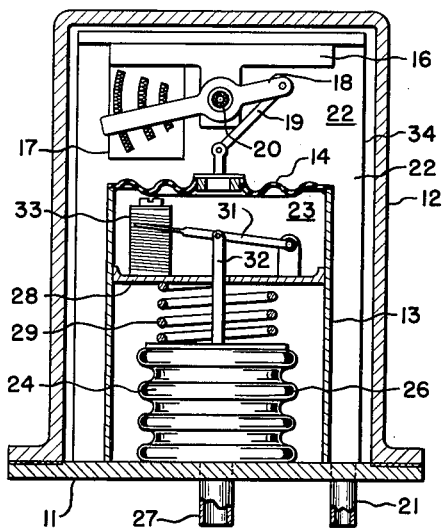
FIGURE 1 is a cross-sectional view showing the relationship of a pair of transducers for sensing related pressures.

Referring now to the drawings wherein like numerals designate like parts throughout the several views, there is shown in FIGURE 1 a mounting base 11 to which is mounted a cylindrical housing 12. Concentrically within housing 12 is another cylindrical shaped housing 13 with a flexible diaphragm 14 over the top. A potentiometer base 16 is mounted in the roof of a perforated sleeve-cup 34 within housing 12 for securing a potentiometer element board 17 and pivotally supporting wiper arm 18. Link 19 connected to diaphragm 14 moves wiper arm 18 across the potentiometer elements on board 17 in response to diaphragm movement. These elements may be serially connected or be independently connected for selective sensitivity. These elements may be linearly or non-linearly resistive as desired or operate as on-off switches for external circuitry. Wiper arm 18 is made of a lightweight material and mounted on jeweled bearings 20 so as to be sensitive to diaphragm movement without contributing measurably to resonant effects in vibration. Diaphragm 14 has physical constants of static deflection and mass such that its resonant frequency in vibration can be calculated readily for theoretical performance figures. Fitting 21 is the sole opening to chamber 22, defined by housing 12, and sleeve-cup 34 for connection to an external pressure source for actuation of diaphragm 14.

Mounted within chamber 23, defined by housing 13, is a third chamber 24 defined by a flexible bellows 26 mounted to base 11. Fitting 27 is the sole opening to chamber 24 for connection to an external pressure source for actuation of bellows 26. Within chamber 23, which has been evacuated and vacuum sealed, is mounted a spring and element support 28. Between this support and the top of bellows 26 is a return spring 29 which provides an equalizer and return for bellows 26. If desired, a spring reinforced type bellows may be used in which the spring is embedded within the bellows material. The bellows and spring combination also has physical constants of static deflection and mass such that their resonant frequencies in vibration can be readily calculated for theoretical performance. Pivotally mounted to support 28 is wiper arm 31, actuated through link 32 in response to movement of bellows 26, which in turn is responsive to pressure within chamber 24. Arm 31 is made of a thin strip bent as a channel iron so that it has a high rigidity to mass ratio for withstanding vibrations. Arm 31 converts pressure within chamber 24 into electrical information by contact with a wire wound potentiometer element 33. This element may be, for example, a precision glass mandrel having microwire wound with any desired choice of resistances or it may serve as a circuit switch, depending upon the use being made of the response to pressure within chamber 24.

It should be noted that normally a bellows has a greater range of linear flexibility than a diaphragm. Therefore, in measuring two related pressures, such as ram and static pressure, inside and outside cabin pressure, fuel and manifold air pressure for example, the pressure source having the greatest expected range of variation should be connected to chamber 24 and the pressure source having the lesser range should be connected to chamber 22. It should also be noted that the transducer elements for measuring the pressure having the larger expected range is also sealed within vacuum chamber 23 and not exposed to the pressure fluid within chamber 24. This alleviates the necessity of a filter in the pressure path, with subsequent inaccuracies, to prevent foreign matter reacting on the elements, causing error due to friction and possible contamination. The transducer elements measuring the lesser range of pressure, such as inside pressure, usually are not exposed to foreign matter so that filtering in chamber 22 is not usually necessary. However, suitable air filtering may be introduced in pipe 21 if desired.

Figure 2:
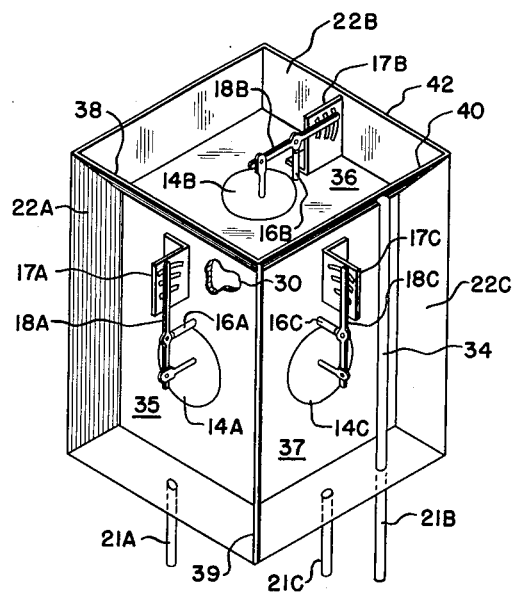
FIGURE 2 shows one view of a modification for a plurality of transducer elements.

Referring now to FIGURE 2 there is shown one view of a modification. The housing covering chambers 22A, 22B, 22C, has been removed. The elements within these chambers are similar to their counterparts in FIGURE 1, being designated with the same numerals but followed with an A, B, or C to denote corresponding pressure chambers. Opening 21B, connecting a pressure to chamber 22B, has an extending member 34 passing through chamber 22C to permit connection of all pressure sources from one side of the device. Walls 35, 36 and 37 define three outer sides of an inner evacuated chamber 30. Here, as in FIGURE 1, the pressures in chambers 22A, 22B and 22C (separated from each other by partitions 38, 39 and 40) are compared by diaphragms 14A, 14B and 14C with a vacuum to give absolute pressures. With a vacuum opposition to pressure, there is no compression of fluid to cause non-linearity of response, heat due to compression and other possible inaccuracies. This has the further advantage that by measuring each pressure independently of the other, an absolute pressure may be read or a differential pressure reading may be made with comparison circuitry in the readout stage.

Figure 3:
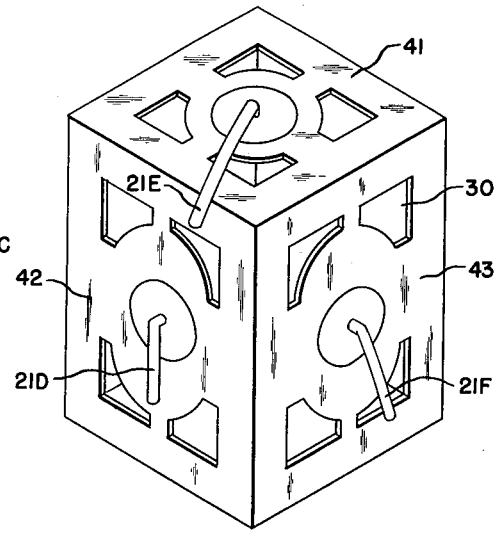
FIGURE 3 shows another view of the same modification.

The three inner perforated walls 41, 42 and 43, shown in FIGURE 3, support three bellows assemblies. Mouted within these walls, so as to be interior to vacuum chamber 30, are the bellows assemblies defining other pressure chambers to which are connected pressure paths 21D, 21E and 21F. Also within the vacuum chamber 30 are the transducing elements on their respective mounts similar to those shown in chamber 23 shown in FIGURE 1. It should be noted that walls 41, 42 and 43 extend beyond their intersection with walls 35, 36 and 37 for sealing engagement with the cover (not shown) to complete chambers 22A, 22B and 22C. Thus, the modification as shown in FIGURE 2 and FIGURE 3 shows three sets of related pressure transducers utilizing a single vacuum chamber as an absolute pressure reference in converting pressure to an electrical measurement, comprising six separate transducers in all.

Figure 4:
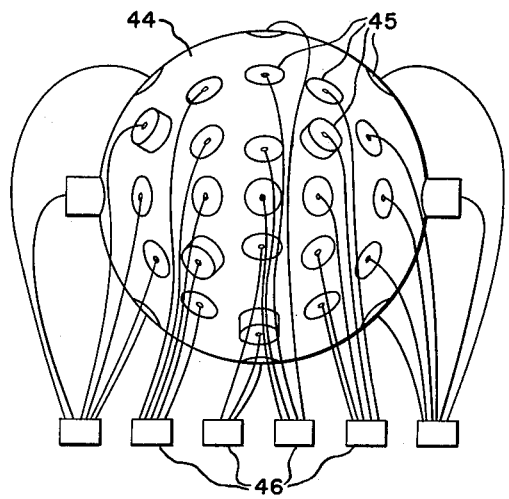
FIGURE 4 shows another modification.

FIGURE 4 shows a spherical vacuum chamber 44 for use as a reference for a plurality of transducer elements 45, each having its own pressure source shown in block diagram form as 46. These sources may be associated with a movable object and data gathering apparatus in connection therewith such as inside and outside pressure, static and ram pressure, fuel and manifold air pressure, and other pressures. These transducers may be bellows or diaphragm actuated or other pressure sensitive means may be used, as desired. By making the vacuum chamber spherical shaped, a maximum number of transducers may be used, some of diaphragm and pressure chamber type externally mounted, and others of the bellows type with the transducer elements mounted within the sphere. Maximum structural strength is also achieved with a spherical vacuum chamber.

The three versions just described in exemplifying embodiments of the present invention are for the purpose of obtaining maximum utility with a minimum of space and weight consistent with dependable service and reliable construction.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A combination pressure transducer having a vacuum chamber and first and second adjacent pressure chambers, said first pressure chamber having a wider range of expected pressure variations than said second pressure chamber, a resilient bellows separating said first pressure chamber from said vacuum chamber, a resilient diaphragm separating said second pressure chamber from said vacuum chamber, said bellows and said diaphragm being movable independently of one another, a first transducer element located in said vacuum chamber and connected to said bellows for converting movement of said bellows into an electrical indication, and a second transducer element located in said second pressure chamber and connected to said diaphragm for converting movement of said diaphragm into an electrical indication, said indications thus being independent of one another and reflective of the movement of said bellows and said diaphrgam with which said transducers are respectively associated.

2. A combination pressure transducer having a vacuum chamber and first and second adjacent pressure chambers, said first pressure chamber having a wider range of expected pressure variations than said second pressure chamber, a resilient bellows separating said first pressure chamber from said vacuum chamber, a resilient diaphragm separating said second pressure chamber from said vacuum chamber, a first transducer element located in said vacuum chamber, said transducer element including an electrical winding, a wiper arm adapted for movement across said winding, a linkage connecting said bellows to said wiper arm, said wiper arm being pivotally mounted at one end in a low-friction bearing and having an L shaped cross section, whereby movement of said bellows is converted into an electrical indication, a second transducer element located in said second pressure chamber and connected to said diaphragm for converting movement of said diaphragm into an electrical indication.

References Cited in the file of this patent

UNITED STATES PATENTS

| 2,217,564 | Scriba | Oct. 8, 1940 |
| 2,394,987 | Deming | Feb. 19, 1946 |
| 2,542,717 | Smith | Feb. 20, 1951 |
| 2,677,963 | Mullins et al. | May 11, 1954 |
| 2,724,760 | Giannini | Nov. 22, 1955 |

FOREIGN PATENTS

| 3,023 of 1886 | Great Britain | Jan. 25, 1887 |